July 25, 1933.      R. JOHN      1,920,081
LAMINATED RIGID STRUCTURAL MATERIAL
Filed June 2, 1933
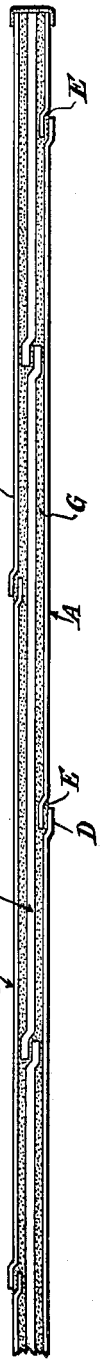
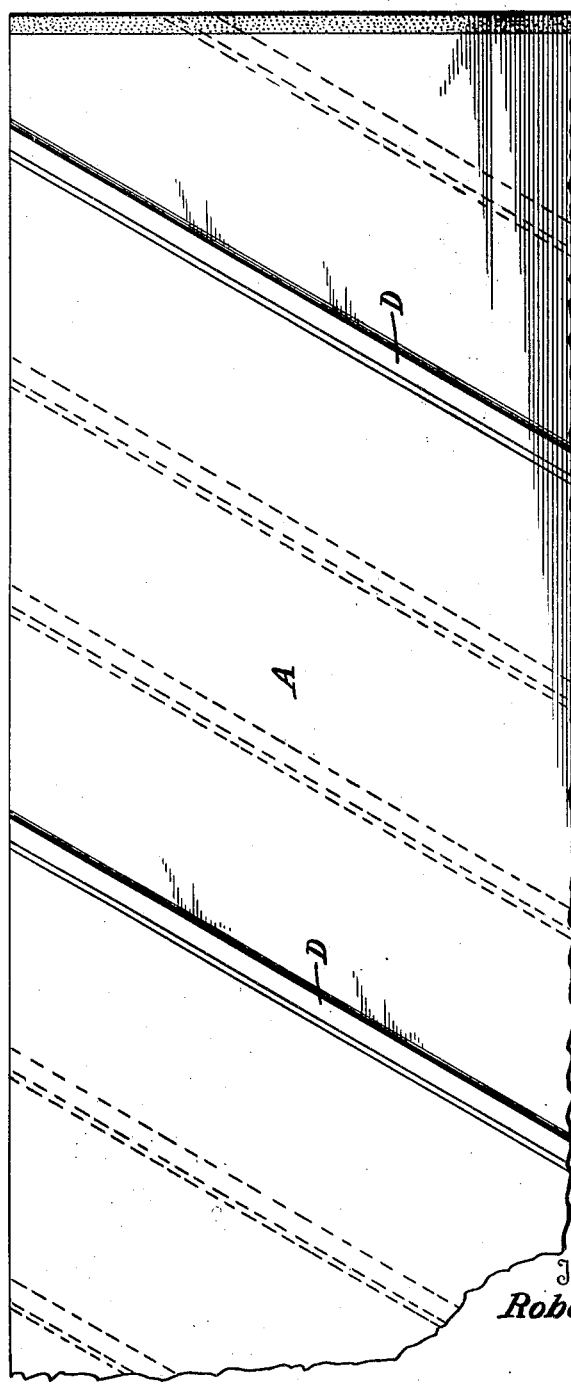
Inventor
Robert John Patented July 25, 1933

1,920,081

UNITED STATES PATENT OFFICE

ROBERT JOHN, OF NEW YORK, N. Y.

LAMINATED RIGID STRUCTURAL MATERIAL

Application filed June 2, 1933. Serial No. 674,061.

This invention relates to a laminated rigid structural material capable of wide usage.

An object of the invention is to provide a structure which is rigid in character, inexpensive to construct and which is moisture-proof and grease-proof.

More specifically, an object of the invention is to provide a laminated structure which is composed of an inner layer of parchmentized paper to which is applied a grease-proof glue filling the pin holes therein and uniting thereto a second layer of chip board, to which in turn is adhered a moisture-proof layer.

Another object of the invention is to provide novel means for sealing the edges of the laminated structure to prevent the discharge of moisture or grease at the ends of the structure.

There are numerous other objects which will be apparent to those skilled in the art from a reading of the following specification in conjunction with the drawing attached hereto and forming a part hereof, in which:—

Figure 1 represents a section of the structure.

Figure 2 is a top view.

Referring now to the drawing, wherein like reference numerals represent corresponding parts, my laminated structure preferably is composed of three layers of spirally wound or obliquely disposed paper designated A, B and C. These windings are so performed as to separate the abutting unions of each layer, one from the other, by methods well known in the existing arts. The inner film A is quite thin and flexible and preferably made of parchmentized paper of approximately five thousandths of an inch in thickness; by "parchmentized" I mean rag or wood pulp paper which has been subjected to the action of sulphuric acid 59 (fifty nine) degrees Baumé, or otherwise treated with an acid, an alkali or cupra-ammonium to render it largely impervious to the absorption of moisture but, of course, other known and approved methods of producing parchmentized paper may be employed. In forming this inner layer A, I lap the spirally wound material by one quarter of an inch, more or less, as at D and apply to the outer surface thereof, in the process of fabricating the structure, any of the well-known gelatinous glues or paste, either animal or vegetable, or compositions thereof such as are commonly used in such a way that the lapped portions are pasted together as indicated at E. Next, I apply a layer of wood pulp paper known as chip board in one or more laminations to the thickness of approximately fifty thousandths of an inch, such chip board being pasted with any of the suitable or well known glues or paste adapted to make it adhere and to prevent it from too rapidly absorbing the glue or paste on the outer surface of the parchmentized paper.

I thereupon apply a layer of glazed partially waterproofed paper F, such as paper with a casein coating, over the chip board intermediate layer B. As a result of these operations, there is provided an outer layer which is substantially repellant to the absorption of moisture from the air, a middle layer for bulk and strength, of dense, inexpensive material which has the capability of absorbing both water and grease if in contact with them, and an inner layer which is quite repellant to moisture, but not sufficiently so repellant to moisture to prohibit the use of soluble glue or paste in cementing it together.

The inner layer A has applied thereto a grease repellant glue G which completely covers the same and which serves to adhere the bulking intermediate layer B thereto, the glue filling any pin holes which may exist in the parchmentized layer A. It is to be particularly observed that the glue is placed on the outside of the inner layer and, therefore, is not in contacting relation with respect to any materials which may contact with the layer A, such, for example, as lubricating oils. Therefore, there is no danger of the glue or other coating material which may be employed, peeling or entering the body of the confined materials which would materially affect the properties thereof. On the other hand the thin film of parchmentized paper and grease-proof glue applied thereto permits flexing of the structure under strains or loads imposed thereon, for instance, during the shipment of containers, without danger of cracking or of peeling as would be the case if the required moisture-proofness was attempted to be imparted by means of interior coatings in surface contact with the oils or other liquids passing therethrough.

While my structure as above described has various uses and applications, the highly absorptive characteristic of the chip board which constitutes a sort of protective barrier, creates the problem of any moisture or grease reaching the same by migrating to the ends after the fashion of a wick. I therefore dip the cut-off ends with a solution of cellulose acetate having a consistency of thick syrup and commonly known as "airplane dope". The dip is merely sufficient to cover the raw edges of the paper to effectively seal the same and extends only a short distance, for instance, one-eighth of an inch along the inner and outer faces of the laminated structure.

The parchmentized paper constituting the inner layer A does not contaminate any liquids which may contact therewith and, being free of protective coatings, does not chemically react with such materials. Additionally, it is important to note that the parchmentized material has very small side wall retention, so that oil or the like has small surface tension as compared with metals or other materials heretofore known and used. If, therefore, the rigid laminated structure is employed as a container, pouring of the contents thereof can be readily accomplished within a minimum of time.

My structure as above designed is quite rigid and can satisfactorily withstand shippage or rough handling without breakage or rupture. The coordination of the various materials and the structures thereof renders the structure grease-proof in one direction and moisture-proof in another, while the dense protective barrier constituting the intermediate lamination, will take up either oil or moisture which may reach the same. If desired, the structure can be made up in the form of tubes and thereafter sub-divided in any desirable manner to make any object which may be desired or applied to any use involving the problems for which this invention is especially fitted.

By the use of the term "film", in characterizing the parchmentized paper, as employed in some of my claims, I intend to define a thin film of paper which is flexible in character as distinguished from a parchmentized "board" of relatively thick character. My structure, as herein stated, is spirally built up and the layers of such a character that they may be wound in the form of a tube as will be apparent from the proposed dimensions thereof as herein given.

Having thus described my invention, I claim:

1. A laminated structure adapted for retaining liquids such as oils comprising a grease-proof inner flexible film of parchmentized material of a character offering small side wall retention for liquids contacting therewith, an intermediate bulky, fibrous lamination possessing high grease and water absorptive characteristics adhered to said parchmentized film and an outer lamination of substantially water repellent character adhered to said intermediate lamination.

2. A laminated structure adapted for retaining liquids such as oils comprising a thin, flexible film of grease-proof parchmentized material of a character offering small side wall retention for liquids contacting therewith, an intermediate bulky, fibrous lamination possessing substantial grease and water absorptive characteristics glued to said parchmentized film, an outer lamination of substantially water repellent material adhered to said inner lamination and means for sealing the edges of said laminations whereby to prevent discharge of oil or grease from the intermediate absorptive lamination and to prevent ingress of moisture thereto.

3. A laminated structure adapted for containers for oil and similar uses comprising an inner film of flexible parchmentized paper of a character offering small side wall retention to the liquids to be discharged therefrom, a layer of grease-proof glue applied thereto and a relatively large, rigid intermediate fibrous lamination possessing substantial grease and water absorptive characteristics adhered to said parchmentized film by said grease-proof glue, and an outer lamination of substantially greater moisture-repellent character than the parchmentized film glued to said intermediate lamination.

4. A laminated structure of the character described comprising an inner lamination of thin, flexible parchmentized material of substantially grease-proof character being insufficiently moisture-proof whereby to receive and retain a glue-like material applied thereto and being free from varnish or similar coatings on its inner face and offering small side wall retention for liquids passing thereover, and intermediate fibrous, bulking lamination secured thereto by said glue and being of substantially grease and moisture adsorptive character, and an exterior layer of substantially moisture-proof material adhered to said intermediate bulking lamination, said structure being characterized by the capability of the bulking lamination to absorb grease which may work through said parchmentized layer and glue and to likewise absorb moisture working from the outside through the moisture-proof material.

5. A laminated structure for use as a side wall for retaining oils and similar liquids comprising a spirally wound inner lamination of thin, flexible parchmentized material with the edges thereof being overlapped and adhered together and having its outer surface only covered with gelatinous material whereby its inner surface is free from such coatings and possesses small side wall retention, a bulking, fibrous lamination of spiral configuration positioned thereon with its point of juncture removed from the point of overlapping of the parchmentized paper and secured thereto by said gelatinous material, and an exterior lamination of waterproof character adhered to said bulking lamination.

6. A laminated structure of the character described comprising a thin film of parchmentized material having its edges overlapped and adhered together, an intermediate layer of fibrous bulking material such as chip board spirally constructed and capable of absorbing grease and moisture and an exterior lamination, spirally constructed, adhered to said bulking lamination and being of substantial moisture-proof character, the abutting unions of each of said layers being separated from those of the other.

7. A laminated structure adapted for retaining liquids such as oils, comprising an intermediate bulky fibrous lamination of material such as chipboard possessing high grease and water absorptive characteristics, an inner oil resistant layer secured thereto and an outer lamination of substantially water-repellant character adhered to said intermediate lamination, such structure being characterized by the capability of the intermediate bulky lamination to absorb grease which may work through said oil resistant layer and to also absorb moisture working from the outside through said outer moisture-repellant lamination, and means for sealing the edge of said intermediate lamination whereby to prevent the discharge of the absorbed fluids therein and to prevent the ingress of moisture thereto, said sealing means comprising a coating of thermo-plastic material.

ROBERT JOHN.